No. 694,743. Patented Mar. 4, 1902.
S. C. GURLEY.
MACHINE FOR MAKING TABLETS.
(Application filed Oct. 5, 1901.)
(No Model.) 4 Sheets—Sheet 4.

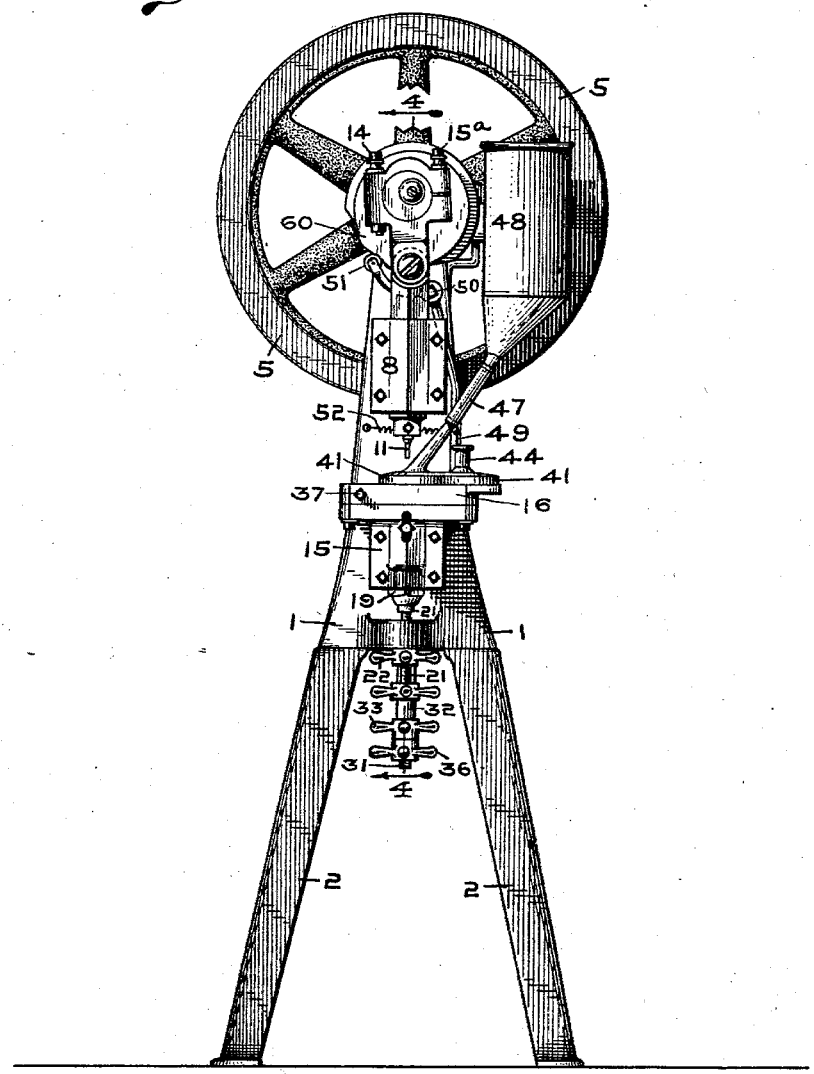

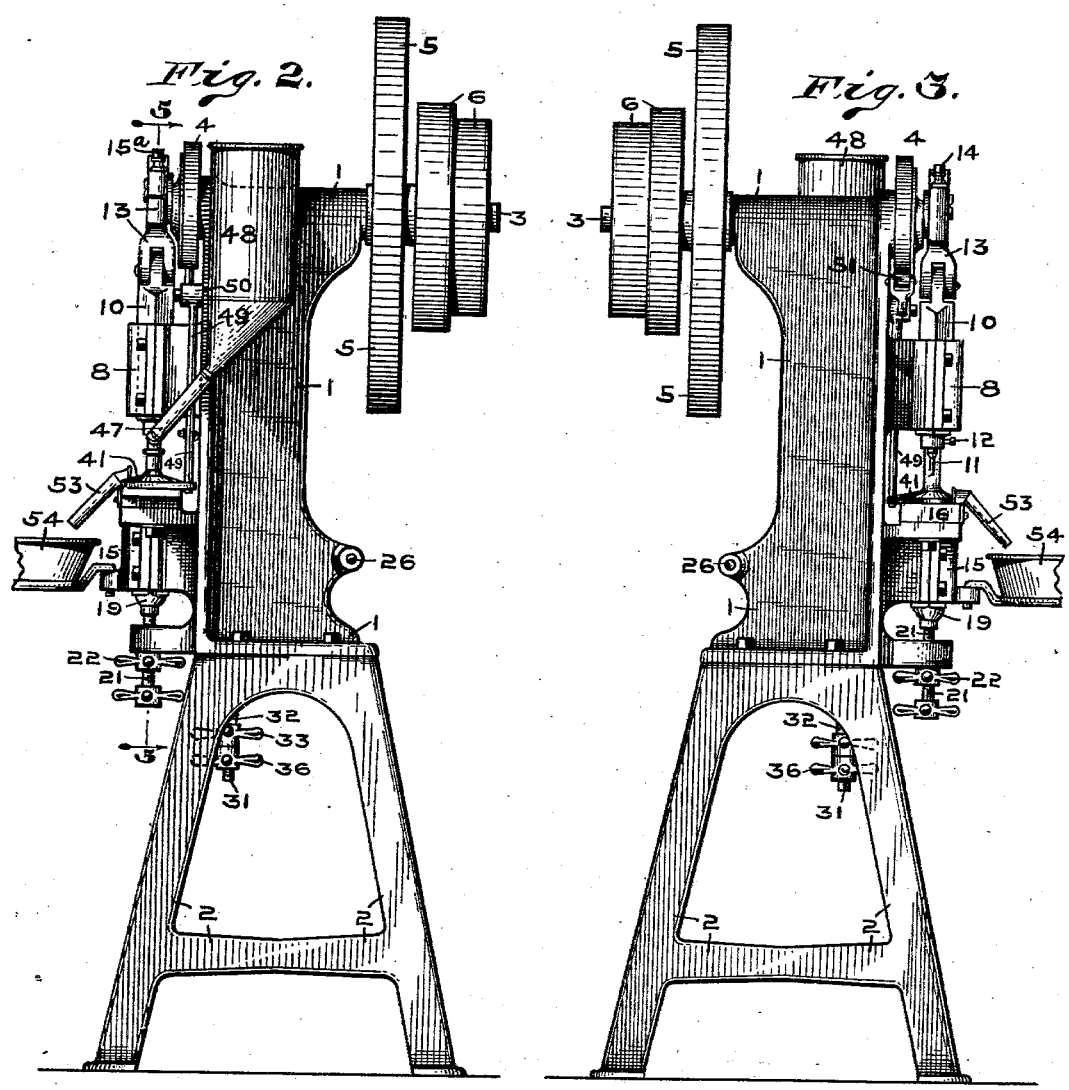

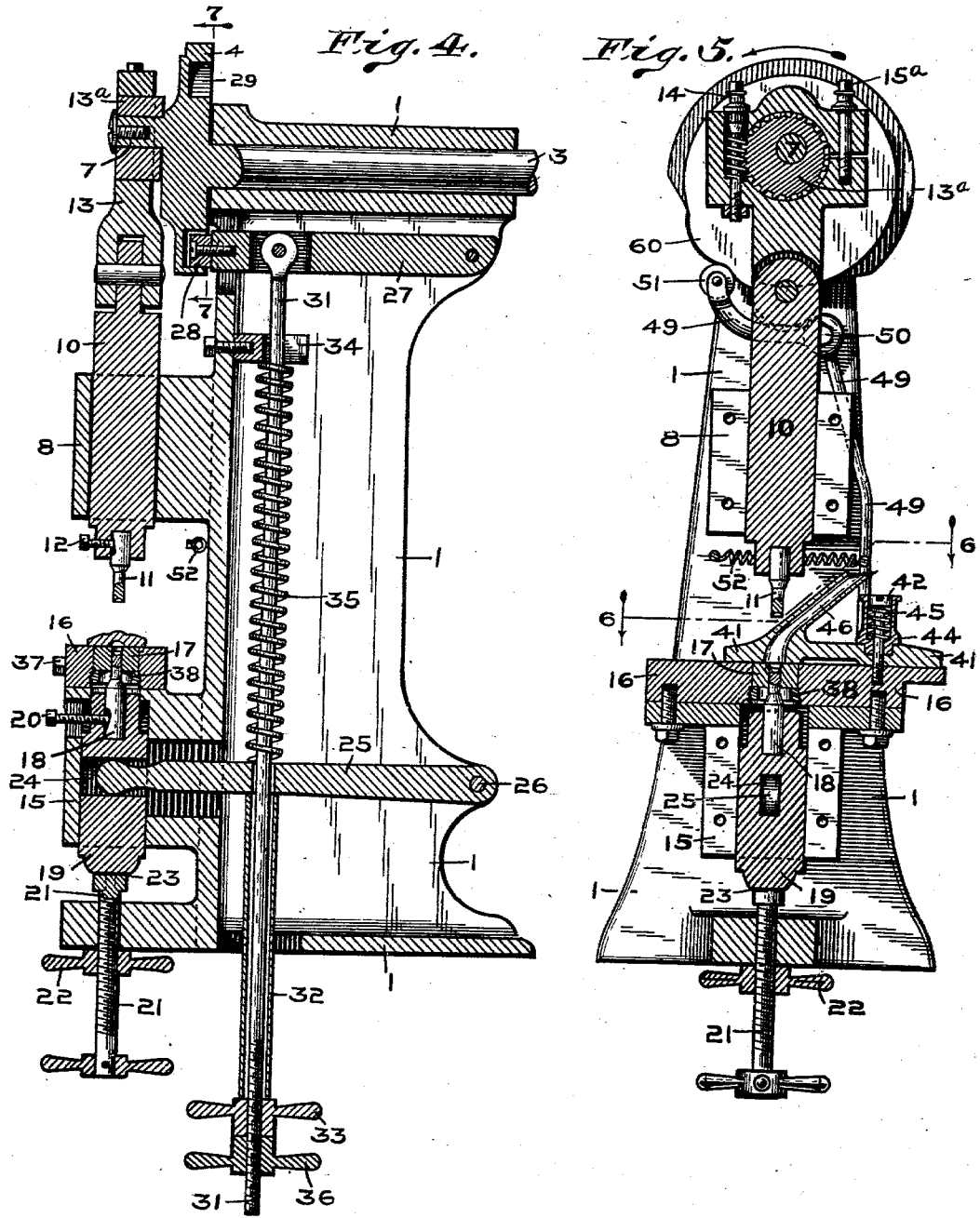

WITNESSES:
F. W. Woerner.
S. Mahlon Unger.

INVENTOR.
Schuyler C. Gurley
BY Joseph A. Minturn,
ATTORNEY.

UNITED STATES PATENT OFFICE.

SCHUYLER C. GURLEY, OF INDIANAPOLIS, INDIANA.

MACHINE FOR MAKING TABLETS.

SPECIFICATION forming part of Letters Patent No. 694,743, dated March 4, 1902.

Application filed October 5, 1901. Serial No. 77,652. (No model.)

*To all whom it may concern:*

Be it known that I, SCHUYLER C. GURLEY, a citizen of the United States, residing at Indianapolis, in the county of Marion and State of Indiana, have invented certain new and useful Improvements in Machines for Making Tablets, of which the following is a specification.

This invention relates to machines for making pharmaceutical and other tablets; and the object is to provide a machine in which the material in powdered form placed in a reservoir or hopper will be fed automatically to the forming-die, where it will be pressed into shape and then discharged by the mechanism of the machine.

The object also is to provide means for carefully discharging the tablet after it is formed, so as not to mar the shape of it in any way.

The further object is to provide means for removing and changing the dies and punches to vary the diameter of the tablet made by the machine and to regulate the thickness of the tablet and the amount of compression that is given to it.

The object is to increase the efficiency of a machine for manufacturing tablets in many ways, which will be hereinafter fully described, and pointed out in the claims.

The objects of the invention are accomplished by the mechanism illustrated in the accompanying drawings, in which—

Figure 6:
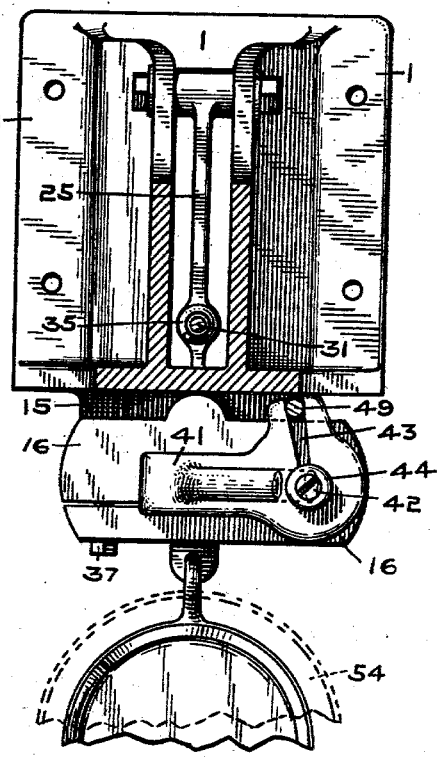
Figure 7:
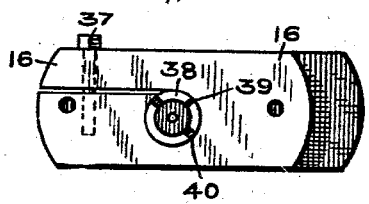

Figure 1 is a front elevation of the complete invention; Fig. 2, a right, and Fig. 3 a left, side elevation of same; Fig. 4, a detail in vertical section on the dotted line 4 4 of Fig. 1; Fig. 5, a vertical section on the dotted line 5 5 of Fig. 2; Fig. 6, a horizontal section on the dotted line 6 6 of Fig. 5; Fig. 7, an under side view of the split die-holding plate, and Fig. 8 a view of the rear or inner side of the cam-wheel.

Like figures of reference indicate like parts throughout the several views of the drawings.

1 represents the body of the machine, consisting, preferably, of a flat front plate rectangular in shape, with greatest dimensions in a vertical direction, having integral sides at right angles thereto and hollow intervening space between the sides. This body rests on legs 2, of any suitable formation. Mounted in the upper end of the body 1 is the shaft 3, having cam-wheel 4, parallel with and resting against plate 1. Mounted on the opposite end of the shaft from wheel 4 is the fly-wheel 5, and outside of that is the cone-belt pulley 6, to which power is applied from any suitable source by means of a belt. (Not shown.) The wheel 4 has the eccentric wrist-pin 7.

Projected forward from the plate 1 is the bracket 8, having a vertical guideway for the plunger-rod 10. The lower end of the plunger-rod has a socket in which is placed the punch 11, held in place by the set-screw 12, which in order to force the punch-body firmly into the socket has the wedge-like formation shown in Fig. 4. Connecting the upper end of the plunger-rod with the wrist-pin is the link bar or pitman 13, and the connection between the upper end of the pitman and the wrist-pin is of peculiar construction, whereby the distance between the center of the wrist-pin and the pintle of the joint between the plunger and the pitman can be varied. The purpose of this adjustment or variation is to enable the maximum descent of the plunger-rod to be adjusted and determined, thereby in part determining the compression given to the tablet. This capability of adjustment of distance between the above-named centers is obtained by means of the following described mechanism: The upper end of the pitman is expanded to form a head which has a circular opening considerably larger in diameter than the diameter of the wrist-pin, and seated in said opening is a wheel 13ª, having an eccentric bore just large enough in diameter to receive the wrist-pin 7, and because of the eccentricity of said bore in said wheel the rotation of the wheel in its seat will correspondingly change the distance between the center of the wrist-pin and the center of the pintle in the joint below. In order to adjust wheel 13ª with precision, its periphery is toothed, and the teeth mesh with the threads of the worm 14, the squared end of which projects outside of the head to engage a suitable key or wrench to be applied thereto in turning the worm to rotate the wheel 13ª. The head of the pitman is split on one side and the split part connected by screw-bolt 15ª, which when tightened up will draw the parts together, thereby clamping the wheel 13ª and rendering it immovable.

Figure 8:
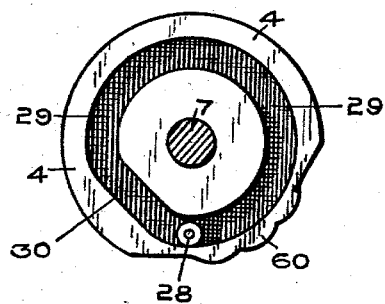

Projected forward from plate 1 is a second bracket 15, upon which is bolted the die-plate 16, having an opening to receive the hardened-steel die 17, which has an opening or hole through it in direct alinement with the punch 11, which takes into it on the downward stroke of said punch. The edges of the tablet are formed by the walls of the hole in the die, and one side of the tablet is formed by the lower end of the punch 11, the other side by a like-shaped punch or plug 18, which enters the die-hole from below and forms the bottom of the mold; but on completion of the tablet the plug 18 rises and ejects the tablet from the mold. This is accomplished by the following means: Supported in a suitable guide on the front of bracket 15 is the second plunger 19, having a socket at its upper end to receive the punch 18, which is secured by set-screw 20 in like manner as described for punch 11. The maximum downward movement of the plunger 19 is controlled by the screw 21, which can be set at any desired adjustment and locked by the lock-nut 22. The plunger rests upon the top of the screw during the compression of the tablet, but lifts off of it by separation at the joint 23 when raised to eject the tablet. It will be noted that the extent of the insertion of the lower punch into the die during the pressing process is controlled by the screw 21 and can be changed. This affords a means for regulating the thickness of the tablet, and the compression given to it will depend on how close the upper and lower punches are brought together in the pressing operation. The plunger 19 has the transverse opening 24, into which takes the end of lever 25. The opposite or rear end of the lever is pivoted at 26 to the body, as shown in Figs. 4 and 6. At the upper end of the body is a similarly-pivoted lever 27, the front end of which has the friction-roller 28, which takes into the groove 29 in the inner side of the wheel 4. (See Figs. 4 and 8.) This is a cam-groove, as shown in Fig. 8, the irregular portion 30 causing an upward throw of the lever 27 in passing.

Pivotally secured to the lever 27 is the downwardly-depending rod 31, which passes through an opening in lever 25, allowing freedom of movement without contact, and thence through a pipe 32, which is held from dropping off by the nut 33 on the threaded end of the rod 31. Projecting into the path of the rod between the two horizontal levers is the guide and stop 34, and between this stop and the lower lever is spring 35, coiled around the rod 31. The spring presses down on the lever 25, lowering the free end of that lever and its attached plunger, except when raised by the cam-groove acting on upper lever 27 and thence through rod 31, pipe 32, and lever 25. The distance between the two levers 25 and 27 is regulated by the nut 33, and a given adjustment is held by the lock-nut 36. By properly adjusting the distance between the levers the throw of the lower one can be made so as to bring the top of the lower punch controlled by it exactly even with the top of the die-plate, which is important, for the reason that if it extended above the plate the shoe, hereinafter to be described, which brushes the finished tablet off would strike the end of the punch, and if it did not come up even with the top of the die the shoulder left by the depression would engage the bottom of the tablet and break off the corners of same when raked off by the shoe.

While the die is made out of hardened steel, it is found that the edges of the hole forming the mold for the tablet rapidly becomes rounded, perhaps partly because of the wear and partly because of the disintegration caused by the chemicals used in making the tablets, and to make the die more serviceable and longer lived it is made removable and reversible, thereby permitting both sides to be used and adjustable, whereby it can be ground down when worn and refastened higher in its seat. To this end the die-plate is split, as clearly shown in Figs. 6 and 7, and the split end drawn together by the bolt 37. Also the opening in the die-plate to receive the die is screw-threaded at its lower portion to receive a screw-threaded sleeve or collar 38. This sleeve or collar is split to allow of its easy insertion and removal, as shown at 39 in Fig. 7, and has wrench-slots 40 to engage a wrench or screw-driver.

41 is the shoe, which rests on top of the die-plate and is pivotally secured thereto by the screw-pin 42. The pin is at the inner end of a lateral slot 43, said end terminating in a round socket to receive the doweled end of a cup 44. The pin 42 passes through this cup, and between the head of the screw and the bottom of the cup is a spring 45, which presses the cup down into the socket, thereby holding the shoe normally in oscillating position around the pin, but by the exertion of a sufficient force allowing the cup to be raised out of the socket, whereby the shoe will be freely removable by sliding it laterally. The front end of the shoe covers the die and its opening, and leading through it is a conduit 46, which connects by the flexible pipe 47 with the reservoir for powder 48. The outlet from the conduit at certain position of the shoe registers with the die-seat for the tablet, and the material for the tablet is delivered through said conduit. A vibratory or shaking movement of the shoe to facilitate the depositing of the powder is given by the lever 49, which is bent, as shown, and pivotally secured at 50 to the plate 1. The lower end of the lever takes into the outer end of the slot 43 of the shoe, and a vibratory movement of that end of the lever obtains by the action of the irregular rim 60 of the cam-wheel 4, which acts on the roller 51, mounted on the upper end of the bent lever 49. Contact of the roller with the wheel 4 is insured by the spring 52. The contour of the cam-wheel 4 is such that during the operation of the pressing of the tablet the shoe is held aside out of the way of the top punch; but when that has done its work and has drawn up out of the way the shoe is actuated with a vibratory or shaking movement across the top of the die-plate. The first lateral movement of the shoe brushes the finished tablet into the conduit 53, whence it is conveyed into the pan 54, placed to receive it, and the continued vibration of the shoe shakes the powder down for a new tablet. The under side of the shoe is preferably cut away at 36 to insure a closer fit over the die.

The hopper is preferably adjustably secured to the body of the press, whereby it can be shifted in position to contract the flexible conduit in order to make the flow less free therethrough when the powder is being fed too freely.

Having thus fully described the invention, what is claimed as new is—

1. A die having a hole through it to form the sides of a mold, a plug capable of a reciprocating movement taking into the die-hole from the bottom, a lever to reciprocate the plug, a revoluble shaft, a cam-wheel mounted thereon, having a wrist-pin, a plunger having a punch said punch taking into the die-hole and said plunger being connected through a pitman with and reciprocated from the wrist-pin on the cam-wheel, said cam-wheel having a cam-groove on its inner side, a second lever having one of its ends taking in the said cam-groove whereby a vibratory movement is given to the lever and means for connecting the two levers whereby they will move in unison.

2. In a tablet-making machine a forming-die having a movable bottom, a lever by which said bottom is moved, a second lever connected with said first lever, a punch taking into said die, a cam-wheel having a wrist-pin on one side and a cam-shaped groove on the other, a pitman connecting the wrist-pin with the bar carrying the punch and said second lever taking into the cam-groove.

3. In a tablet-making machine a forming-die having a movable bottom, a lever controlling the movement of said bottom, a driving-shaft, a cam-wheel mounted thereon having a cam-groove, a second lever actuated by the cam-groove, a bolt connecting the two levers having a screw-threaded end, a nut on said threaded end whereby the distance between the levers can be regulated and a spring pressing the lower lever away from the upper one.

4. A die-plate, a removable and reversible die seated therein and supported by an adjustable collar.

5. A die-plate having an opening with a round screw-threaded lower portion, a threaded collar screwing into said threaded lower portion and a removable and reversible die seated in said opening and supported by said collar.

6. A die-plate having an opening with a round screw-threaded lower portion, said plate having a split extending from one edge to the opening, a bolt to draw the split parts together, a split screw-threaded collar screwed to the lower part of the opening and a removable and reversible die seated in said opening above the collar and supported thereby.

7. A shoe, having a socket and a lateral slot less in width than the diameter of the socket leading therefrom to the margin of the shoe, a cup seated in said socket, a headed bolt passing through the cup and socket and a spring between the bolt-head and the bottom of the cup.

8. A die-plate having a die with a die-hole, a shoe pivotally secured to the plate and having a conduit registering with the die-hole at certain positions of the shoe, means for oscillating the shoe and a reservoir containing material to be fed through the shoe to the die-hole and a tube connecting the conduit of the shoe with the reservoir.

In witness whereof I have hereunto set my hand and seal, at Indianapolis, Indiana, this 27th day of September, A. D. 1901.

SCHUYLER C. GURLEY. [L. S.]

Witnesses:
JOSEPH A. MINTURN,
S. MAHLON UNGER.